United States Patent

Kawanishi et al.

Patent Number: 4,631,085
Date of Patent: Dec. 23, 1986

[54] AQUEOUS INK COMPOSITION FOR INK-JET RECORDING

[75] Inventors: Toshiyuki Kawanishi, Numazu; Masaru Shimada; Kakuji Murakami, both of Shizuoka; Tamotsu Aruga; Hiroyuki Uemura, both of Numazu, all of Japan

[73] Assignee: Ricoh Company, LTD., Tokyo, Japan

[21] Appl. No.: 790,197

[22] Filed: Oct. 22, 1985

[30] Foreign Application Priority Data

Oct. 23, 1984 [JP] Japan ................. 59-221275

[51] Int. Cl.$^4$ .............................. C09D 11/02
[52] U.S. Cl. ...................................... 106/22
[58] Field of Search ............... 106/22; 534/560, 733, 534/751, 798

[56] References Cited

U.S. PATENT DOCUMENTS 2,779,755 1/1957 Ruckstuhl et al. ............ 534/560
4,512,807 4/1985 Ogawa et al. .................. 106/22

Primary Examiner—Amelia B. Yarbrough
Attorney, Agent, or Firm—Oblon, Fisher, Spivak, McClelland, & Maier

[57] ABSTRACT

An aqueous ink composition for ink-jet recording comprising an aqueous solution of a water-soluble dye of formula (I) and a humectant dissolved in water:

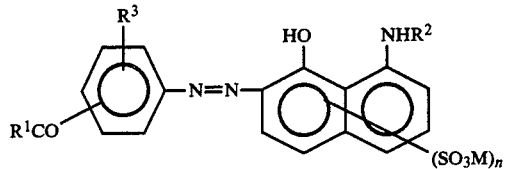

wherein $R^1$ represents

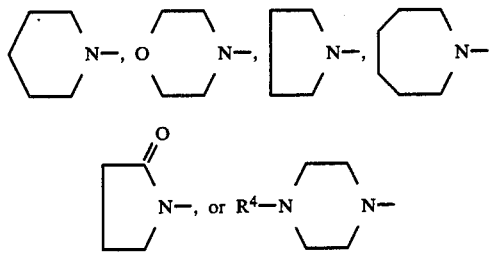

wherein $R^4$ represents an alkyl group or a hydroxyalkyl group; $R^2$ represents hydrogen, an alkyl group, an acetyl group, an unsubstituted or substituted benzoyl group, an unsubstituted or substituted benzenesulfonyl group, or a substituted 1,3,5-triazine ring; $R^3$ represents hydrogen, an alkyl group, an alkoxy group, halogen or a sulfonic acid group; M represents hydrogen ion, an alkali metal cation, amine cation or an ammonium ion; and n is an integer of 1, 2 or 3.

9 Claims, No Drawings

AQUEOUS INK COMPOSITION FOR INK-JET RECORDING

BACKGROUND OF THE INVENTION

The present invention relates to an aqueous ink composition suitable for use as printing ink. More particularly, it relates to an aqueous ink composition for ink-jet recording, which is capable of yielding printed images with high quality (i.e., high clearness and sharpness, etc.), and which is also capable of providing stable ink ejection, without causing the plugging of the nozzles of the ink-jet recording apparatus, even if it is used continuously for a long period of time or if it is used intermittently after a period of non-use of the ink-jet recording apparatus.

Generally, an aqueous ink comprises as the main components a dye, water and a humectant. In particular, an aqueous ink for use in ink-jet recording should satisfy the following conditions in order to yield an excellent print:

First, in order that the ink be compatible with ink droplet formation and control of the direction of the ejected ink droplet streams, it is necessary that its viscosity, surface tension, specific electric conductivity, and density each fall within certain appropriate ranges.

Second, it is necessary that no precipitates be separated, due to coagulation, precipitation, chemical change of slightly soluble components or other causes, from the ink during an extended period of continuous use or storage, or during the periods when the apparatus is not in use. Nor should the physical properties of the ink otherwise change during the above-mentioned periods. If the separated solid components or viscous materials in the ink become affixed around the nozzles, or if the physical properties of the ink change, deviating from the predetermined physical properties achieved at the time of the preparation, the desired printing quality, the desired ink ejection stability, and the desired ink ejection response cannot be obtained.

Third, it is desired that the ink provide adequately high contrast, clearness and the desired color in the printed image, in particular, for use with full-color printers.

Fourth, it is necessary that the ink for ink-jet recording be such that the printed images are resistant to water, light and physical wear.

Fifth, it is necessary that the images printed by the ink dry rapidly.

So far, many proposals have been made for an ink for ink-jet recording, but from the viewpoint of practical use, a satisfactory ink which is capable of meeting the above-described requirements has not been found.

SUMMARY OF THE INVENTION

It is therefore an object of the present invention to provide an aqueous ink composition for ink-jet recording completely satisfying the above outlined conditions. That is to say, the object of the present invention is to provide an aqueous ink composition for ink-jet printing which does not result in plugging of the nozzles, does not change in quality or separate precipitates therefrom with time during storage, but exhibits excellent ink-ejection stability, and has good ink ejection response, shows slight changes in physical properties, if any, when used for a long period with continuous recirculation, or when used intermittently, and, yields printed images which are non-spreading, and have high sharpness and high image density.

The above object of the present invention is attained by an aqueous ink composition comprising an aqueous solution of a water-soluble dye having the following formula and a humectant dissolved in water, if necessary with addition of other additives thereto:

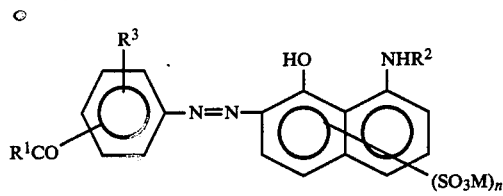

wherein $R^1$ represents

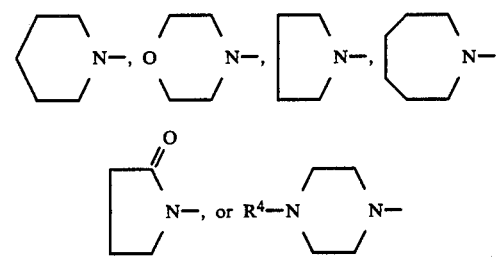

wherein $R^4$ represents an alkyl group or a hydroxyalkyl group; $R^2$ represents hydrogen, an alkyl group, an acetyl group, an unsubstituted or substituted benzoyl group, an unsubstituted or substituted benzenesulfonyl group, or a substituted 1,3,5-triazine ring; $R^3$ represents hydrogen, an alkyl group, an alkoxy group, halogen or a sulfonic acid group; M represents hydrogen ion, an alkali metal cation such as $Li^+$, $Na^+$ and $K^+$, amine cation or an ammonium ion; and n is an integer of 1, 2 or 3.

DETAILED DESCRIPTION OF THE PREFERRED EMBODIMENTS

An aqueous ink composition according to the present invention comprises a water-soluble dye of the above described formula, water and a humectant.

In the following table 1, there are listed representative examples of the water-soluble dyes having the above formula for use in the present invention:

TABLE 1

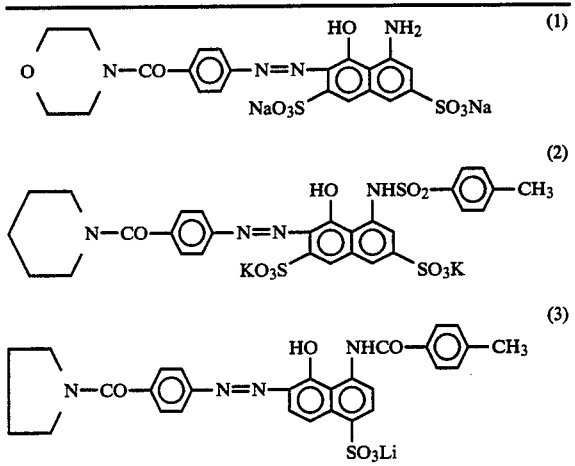

TABLE 1-continued

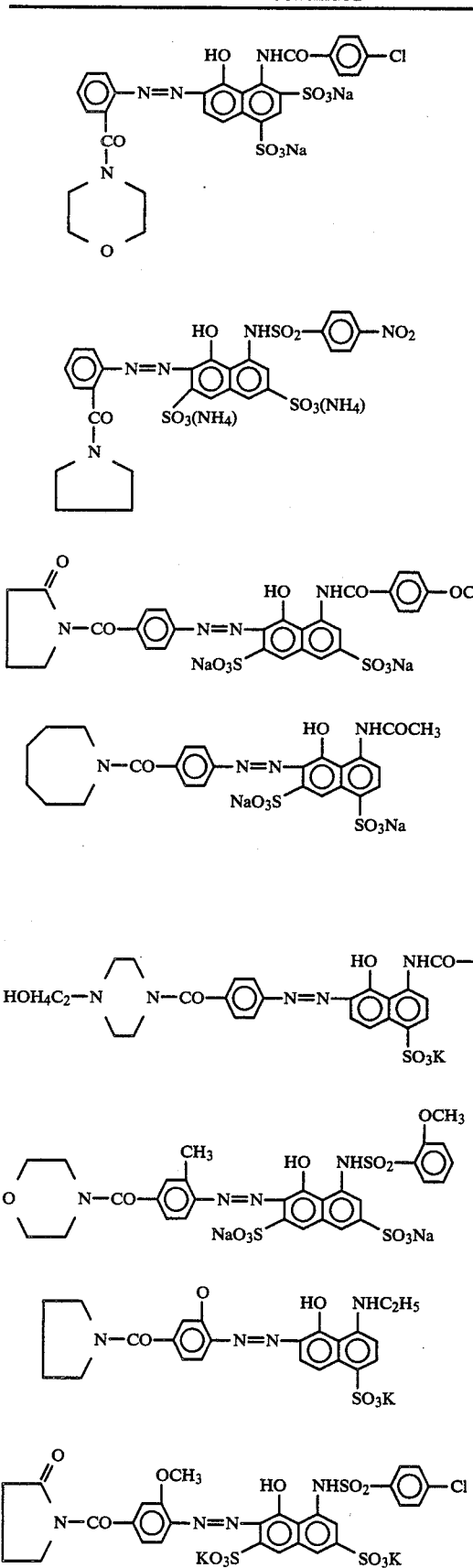

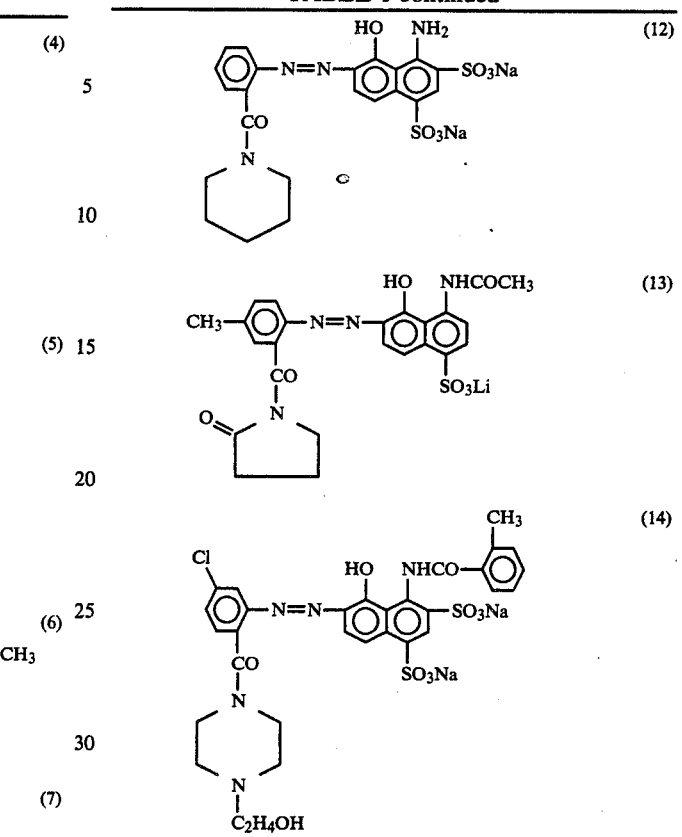

The above dyes can be prepared by a conventional method. For example, the dye (1) given in Table 1, which is a red water-soluble dye, can be prepared as follows: One mole of 4-nitrobenzoyl chloride is allowed to react with 2 moles of morpholine in dioxane at a temperature below room temperature, so that 4-nitrobenzoylmorpholine (m.p. 108° 109° C.) is obtained. The thus obtained nitro compound is reduced in the presence of a 5%Pd-C catalyst to produce 4-aminobenzoylmorpholine. This is subjected to diazotization by a conventional method to produce a diazonium compound, which is then coupled with H-acid in an alkaline solution, followed by subjecting it to acidic precipitation, so that the dye (I) in Table 1 is obtained.

In the present invention, it is preferable that the dye be contained in an amount of 0.1 to 20 parts by weight, more preferably 0.5 to 6 parts by weight, with respect to 100 parts by weight of the ink composition in order to obtain high printing quality.

The humectant for use in the present invention, which is employed together with water, is for adjusting the physical properties of the ink composition so as to have the desired properties, to control the drying speed of the ink composition and to increase the solubility of the dye employed in the solvent of the ink composition.

Examples of such humectants for use in the aqueous ink according to the present invention are polyhydric alcohols, alkyl ethers of polyhydric alcohols, amine derivatives such as triethanol amine, amides such as dimethylformamide, and nitrogen-containing heterocyclic compounds such as N-methyl-2-pyrrolidone, 2-pyrrolidone and 1,3-dimethyl imidazolidinone.

Specific examples of the polyhydric alcohols are ethylene glycol, diethylene glycol, triethylene glycol, polyethylene glycol, polypropylene glycol and glycerin.

Specific examples of the alkyl ethers of polyhydric alcohols are ethylene glycol monoethyl ether, ethylene glycol monobutyl ether, diethylene glycol monomethyl ether, diethylene glycol monoethyl ether, diethylene glycol monobutyl ether, triethylene glycol monomethyl ether and triethylene glycol monoethyl ether.

Of the above mentioned humectants, the most preferable humectants are diethylene glycol, polyethylene glycol (200 to 600), triethylene glycol, ethylene glycol, glycerin and N-methyl-2-pyrrolidone, by which the solubility of the employed dye in the solvent of the ink composition can be increased and the evaporation of water from the ink composition can be appropriately controlled, so that the initial properties of the ink can be maintained even for an extended period of continuous use or storage, or during the periods when the apparatus is not in use, whereby reliable ink droplet stability and ink droplet ejection response of the ink, particularly after a prolonged period of non-use of the apparatus, are obtained.

In the present invention, it is preferable that the above humectant be contained in an amount of 5 to 80 parts by weight, more preferably 10 to 40 parts by weight, with respect to 100 parts by weight of the ink composition according to the present invention, from the viewpoint of obtaining an appropriate viscosity and drying speed of the ink composition.

In the present invention, in addition to the above humectants, additives, for instance, water-soluble preservative and anti-mold agents, pH adjustment agents, specific electric conductivity adjustment agents, chelating agents and anti-rusting agents, can be added to the ink composition.

As water-soluble preservative and anti-mold agents, for example, sodium dehydroacetate, sodium sorbate, 2-pyridine thiol-1-oxide sodium salt, sodium benzoate and sodium pentachlorophenol can be employed.

As pH adjustment agents, any materials can be used optionally, so long as they do not have an adverse effect on the ink composition and can control the pH of the ink composition within the range of pH 9.0 to 11.0.

Specific examples of such pH adjustment agents are amines, such as diethanolamine and triethanolamine; hydroxides of alkali metals, such as lithium hydroxide, sodium hydroxide and potassium hydroxide; ammonium hydroxide; and carbonates of alkali metals, such as lithium carbonate, sodium carbonate and potassium carbonate.

As specific electric conductivity adjustment agents, inorganic salts such as potassium chloride, ammonium chloride, sodium sulfate and sodium carbonate, and water-soluble amines such as triethanolamine can be employed.

As chelating agents, for example, sodium ethylenediaminetetraacetate, trisodium nitrilotriacetate, hydroxyethyl ethylenediamine trisodium acetate, diethylene triamino pentasodium acetate and uramil disodium acetate can be employed.

As rust preventing agents for the nozzles, for example, acid sulfites, sodium thiosulfate, ammonium thioglycolate, diisopropyl ammonium nitrite, pentaerythritol tetranitrate and dicyclohexyl ammonium nitrite can be employed.

Other additives, for example, water-soluble ultraviolet-ray-absorbing agents, water-soluble infrared-ray-absorbing agents, water-soluble polymeric compounds, solubility increasing agents for increasing the solubility of the dye dissolved in the solvent of the ink composition, and surfactants can be employed as thought necessary in specific embodiments of an aqueous ink composition for ink-jet recording according to the present invention.

Preferred embodiments of an aqueous ink for ink-jet recording according to the present invention will now be explained by referring to the following examples:

EXAMPLE 1

A mixture of the following components was heated to about 50° C. and stirred until completely dissolved. The mixture was then filtered twice through a membrane filter with a 0.2 μm mesh, whereby an aqueous ink composition No. 1 according to the present invention was prepared:

|  | wt. % |
|---|---|
| Dye (1) in Table 1 | 3.0 |
| Glycerin | 5.0 |
| Diethylene glycol | 15.0 |
| Sodium dehydroacetate | 0.2 |
| Ion-exchanged water | 76.8 |

The ink composition was then subjected to the following tests: (1) Image Clarity and Image Dryness Test The ink composition was caused to issue from a nozzle with an inner diameter of 30 μm, with vibrations at a frequency of 100 KHz, by which vibrations the ink was ejected in a stream broken into individual drops, and was then caused to impinge on a sheet of commercially available high quality paper. As a result, clear images were obtained on each of the sheet. The time required for drying the printed image was not more than 10 seconds at normal room temperature and humidity.

(2) Preservability Test

Samples of the ink composition were tightly sealed in glass containers and subjected to the following storage tests:

a. Preserved at −20° C. for one month;
b. Preserved at 4° C. for one month;
c. Preserved at 20° C. for one year; and
d. Preserved at 90° C. for one week.

Separation of precipitates from the ink composition was not observed at all in storage. In addition, no changes were detected in the properties or color of the ink composition.

(3) Ink Droplet Ejection Stability Test

Ink-jet recording as was done in the above-described Image Clarity and Image Dryness Test was continuously carried out for 1,000 hours. There was no evidence of either clogging of the nozzle or change in ejection direction of the ink droplets; rather, stable recording was maintained.

(4) Ink Droplet Ejection Response Test

After ink-jet recording was performed as outlined in (1), the apparatus and ink composition were allowed to stand at at room temperature and humidity for one month, after which they were used again to perform ink-jet recording under the same conditions as previously stated in (1). As in (3) above, there was no change in the ink droplet ejection stability.

The above test was repeated in the same manner, except that the apparatus and ink were allowed to stand at 40° C., 30% RH for one week, instead of being allowed to stand at room temperature and humidity for one month. The result was that again no change was observed in the ink droplet ejection stability.

EXAMPLE 2

Example 1 was repeated except that the dye (1) employed in Example 1 was replaced by the dye (3) in Table 1, having the following formula, whereby an aqueous ink composition No. 2 for ink-jet recording according to the present invention was prepared:

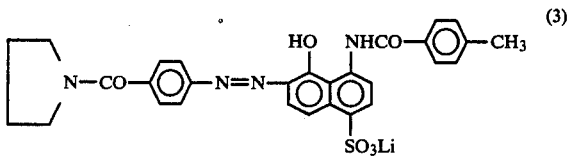
(3)

EXAMPLE 3

Example 1 was repeated except that the dye (1) employed in Example 1 was replaced by the dye (6) in Table 1, having the following formula, whereby an aqueous ink composition No. 3 for ink-jet recording according to the present invention was prepared:

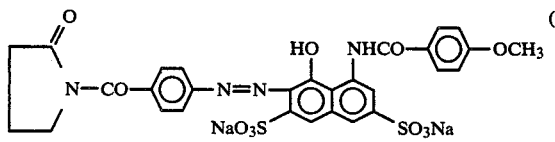
(6)

EXAMPLE 4

Example 1 was repeated except that the dye (1) employed in Example 1 was replaced by the dye (9) in Table 1, having the following formula, whereby an aqueous ink composition No. 4 for ink-jet recording according to the present invention was prepared:

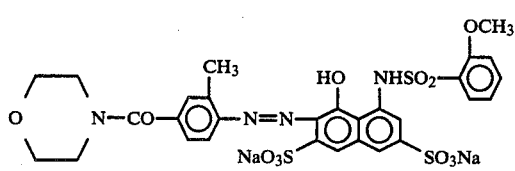
(9)

EXAMPLE 5

Example 1 was repeated except that the dye (1) employed in Example 1 was replaced by the dye (14) in Table 1, having the following formula, whereby an aqueous ink composition No. 5 for ink-jet recording according to the present invention was prepared:

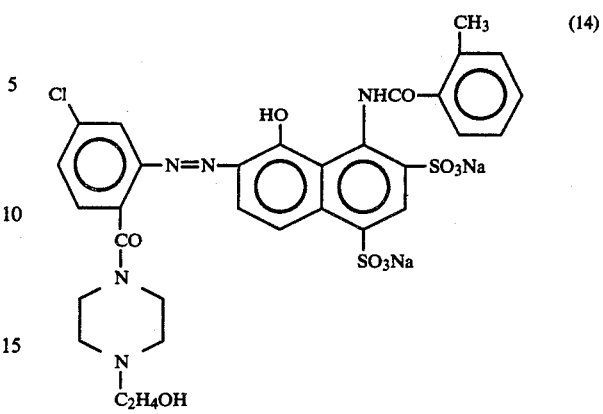
(14)

COMPARATIVE EXAMPLE

Example 1 was repeated except that the dye (1) employed in Example 1 was replaced by Acid Red 254, whereby a comparative aqueous ink composition for ink-jet recording was prepared.

The aqueous inks No. 2 through No. 5 according to the present invention and the comparative aqueous ink were also subjected to the same tests as in Example 1. The results were as follows:

TABLE 2

| | Ex. 2 | Ex. 3 | Ex. 4 | Ex. 5 | Comparative Example |
|---|---|---|---|---|---|
| Image Clarity | Clear M | Clear M | Clear M | Clear R | Nearly clear M |
| Image Dryness (seconds) | <10 | <10 | <10 | <10 | <10 |
| Preservability | Same | Same | Same | Same | Precipitates formed at 90° C. for 1 week |
| Ink Droplet Ejection Stability | Same | Same | Same | Same | Ejecting direction changed due to partial clogging |
| Ink Droplet Ejection Response | Same | Same | Same | Same | Unstable due to partial clogging in storage at 40° C. for 1 week |

In the above table, the symbols "M" and "R" respectively stand for magenta and red, and the term "Same" means the same as in Example 1. Further, in the above table "<10" denotes 10 seconds or less. The above results indicate that the aqueous ink compositions according to the present invention are exceedingly better in every respect as compared with Comparative Example.

What is claimed is:

1. An aqueous ink composition for ink-jet recording comprising an aqueous solution of a water-soluble dye of formula (I) and a humectant dissolved in water:

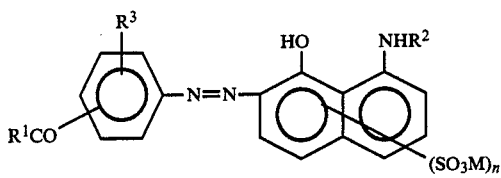

wherein $R^1$ represents

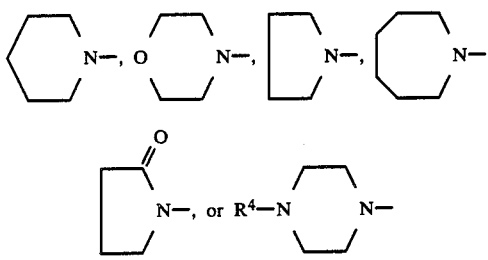

wherein $R^4$ represents an alkyl group or a hydroxyalkyl group; $R^2$ represents hydrogen, an alkyl group, an acetyl group, an unsubstituted or substituted benzoyl group, an unsubstituted or substituted benzenesulfonyl group, or a substituted 1,3,5-triazine ring; $R^3$ represents hydrogen, an alkyl group, an alkoxy group, halogen or a sulfonic acid group; M represents hydrogen ion, an alkali metal cation, amine cation or an ammonium ion; and n is an integer of 1, 2 or 3.

2. An aqueous ink composition for ink-jet recording as claimed in claim 1, wherein the amount of said dye is in the range of 0.1 to 20 parts by weight with respect to 100 parts by weight of said aqueous ink composition.

3. An aqueous ink composition for ink-jet recording as claimed in claim 1, wherein said humectant is at least one compound selected from the group consisting of polyhydric alcohols and ethers thereof, and the mount of said humectant is in the range of 5 to 80 parts by weight with respect to 100 parts by weight of said aqueous ink composition.

4. An aqueous ink composition for ink-jet recording as claimed in claim 1, wherein said humectant is at least one compound selected from the group consisting of triethanol amine, dimethylformamide, N-methyl-2-pyrrolidone, 2-pyrrolidone and 1,3-dimethyl imidazolidinone, and the amount of said humectant is in the range of 5 to 80 parts by weight with respect to 100 parts by weight of said aqueous ink composition.

5. An aqueous ink composition for ink-jet recording as claimed in claim 1, further comprising a water-soluble preservative and anti-mold agent.

6. An aqueous ink composition for ink-jet recording as claimed in claim 3, wherein said polyhydric alcohol is selected from the group consisting of ethylene glycol, diethylene glycol, triethylene glycol, polyethylene glycol, polypropylene glycol and glycerin.

7. An aqueous ink composition for ink-jet recording as claimed in claim 3, wherein said ether of polyhydric alcohol is selected from the group consisting of ethylene glycol monoethyl ether, ethylene glycol monobutyl ether, diethylene glycol monomethyl ether, diethylene glycol monoethyl ether, diethylene glycol monobutyl ether, triethylene glycol monomethyl ether and triethylene glycol monoethyl ether.

8. An aqueous ink composition for ink-jet recording as claimed in claim 5, wherein said water-soluble preservative and anti-mold agent is selected from the group consisting of sodium dehydroacetate, sodium benzoate, 2-pyridine thiol-1-oxide sodium salt and sodium pentachlorophenol.

9. An aqueous ink composition for ink-jet recording as claimed in claim 1, wherein said water-soluble dye is selected from the group consisting of:

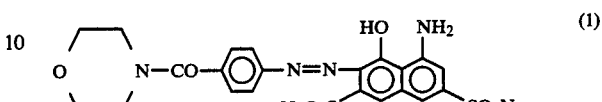

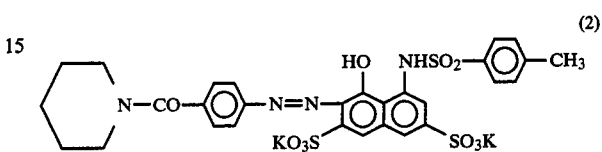

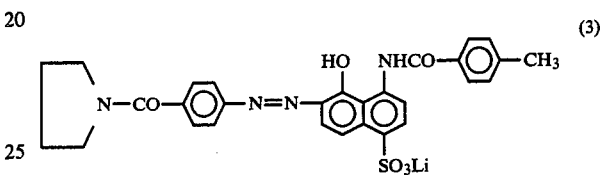

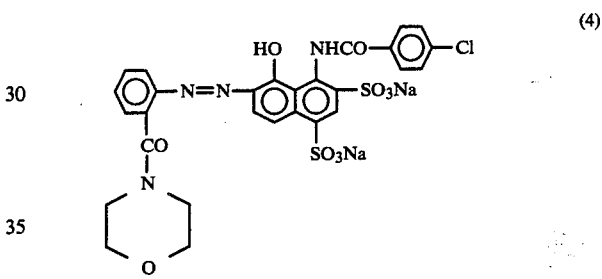

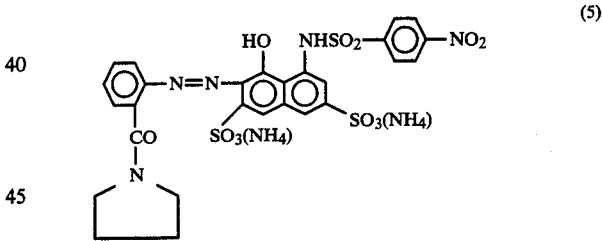

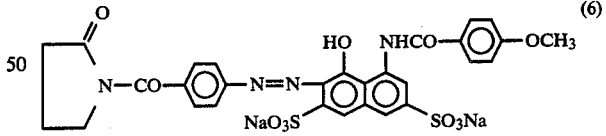

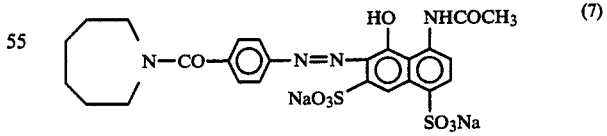

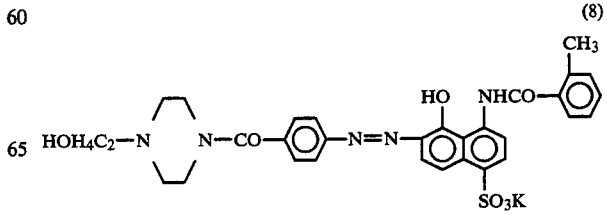

-continued
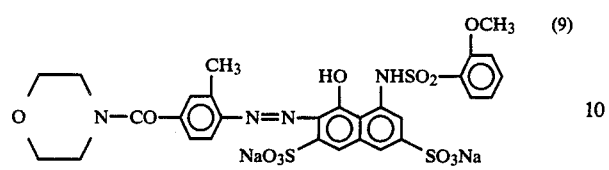 (9)
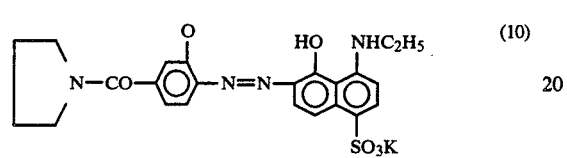 (10)
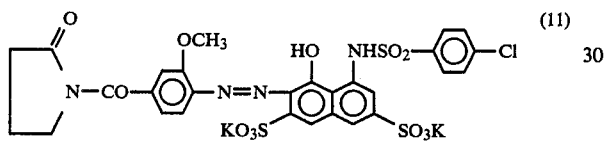 (11)
-continued
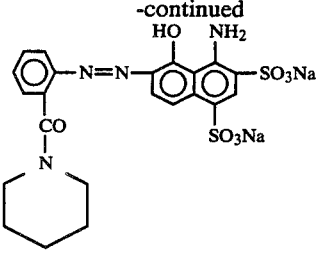 (12)
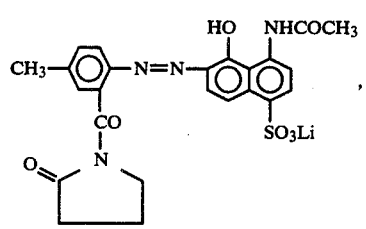 (13)
and
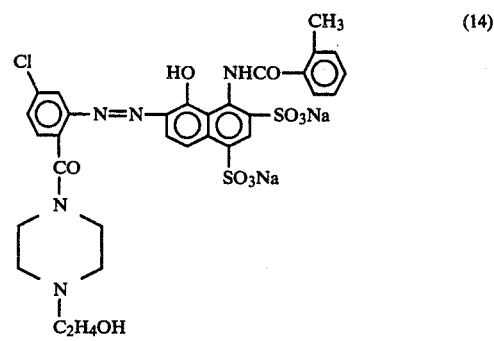 (14)
* * * * *